US006604621B1

(12) United States Patent
Matsuo et al.

(10) Patent No.: US 6,604,621 B1
(45) Date of Patent: Aug. 12, 2003

(54) VARIABLE-SPEED MOVING SIDEWALK AND METHOD OF DESIGNING IT

(75) Inventors: Kenro Matsuo, Osaka (JP); Kouki Sato, Osaka (JP); Masakuni Honda, Osaka (JP)

(73) Assignee: Fujitec Co., Ltd., Osaka (JP)

( * ) Notice: Subject to any disclaimer, the term of this patent is extended or adjusted under 35 U.S.C. 154(b) by 0 days.

(21) Appl. No.: 09/857,862

(22) PCT Filed: Dec. 9, 1999

(86) PCT No.: PCT/JP99/06897

§ 371 (c)(1), (2), (4) Date: Jul. 9, 2001

(87) PCT Pub. No.: WO00/35801

PCT Pub. Date: Jun. 22, 2000

(30) Foreign Application Priority Data

Dec. 11, 1998 (JP) .......................................... 10-375082

(51) Int. Cl.[7] ............................................... B65G 29/08
(52) U.S. Cl. ....................................................... 198/324
(58) Field of Search ................................. 198/324, 334

(56) References Cited

U.S. PATENT DOCUMENTS 3,759,188 A * 9/1973 Woods ................... 198/324 X
4,232,776 A * 11/1980 Dean ...................... 198/324 X
5,044,485 A * 9/1991 Loder ..................... 198/334 X
5,423,408 A 6/1995 Loder ......................... 198/324
5,538,124 A * 7/1996 Loder ......................... 198/324

FOREIGN PATENT DOCUMENTS

| | | |
|---|---|---|
| EP | 0290255 | 11/1988 |
| EP | 0982261 | 3/2000 |
| JP | 3011686 | 3/1995 |
| JP | 8-26648 | 1/1996 |
| JP | 8-59162 | 3/1996 |
| JP | 9-77444 | 3/1997 |

* cited by examiner

*Primary Examiner*—James R. Bidwell
(74) *Attorney, Agent, or Firm*—Jordan and Hamburg LLP

(57) ABSTRACT

In a moving sidewalk comprising loading-unloading belts and one or more of accelerating-decelerating belt(s) independently provided in front and in the rear of the main circulating belt, wherein the traveling speed of the loading-unloading belt and of the accelerating-decelerating belt are determined to decrease with the decreasing distance to the entrance and the exit thereof, and thus to increase with the decreasing distance to the main circulating belt, and the traveling speed of the main circulating belt is faster than both of these belts, the speeds of the belts adjacent with each other are determined so that the difference between squares of the speeds of these belts does not exceed the prescribed value in order to give no feeling of fear to the passenger.

4 Claims, 7 Drawing Sheets

(a) PRIOR ART (b) PRIOR ART

VARIABLE-SPEED MOVING SIDEWALK AND METHOD OF DESIGNING IT

TECHNICAL FIELD

The present invention relates to a moving sidewalk for transporting passengers safely and quickly even for a relatively long distance.

BACKGROUND ART

In general, the normal moving sidewalk traveling at the speed of 30 m/min. or 40 m/min. has a problem that it travels too slow and thus it takes too long for passenger transportation when located at the places such as the airport.

Therefore, a new type of moving sidewalk that moves slowly when the passenger gets on and off, and moves at a high speed at the midsection has been craved for, and a moving sidewalk as disclosed in Japanese Patent Laid-Open No.75594/1990 is proposed.

That is, FIG. 2 shows a schematic drawing of a moving sidewalk constructed of a plurality of endless circulating belts, which was shown in the patent publication described above, and FIG. 3 is partially enlarged view of the moving sidewalk shown in FIG. 2.

The reference numerals 2 and 2' designate an independent module in which a very thin and very flexible endless sliding belt 20 passes below a pair of guide rollers 2*b* and driven by the driving rollers 2*c* at a constant speed. The module 2 which is to be located near the entrance and the exit of the moving sidewalk, for example, is set to travel at a low speed and the modules 2' which are located away from the entrance and the exit of the moving sidewalk are set in such a manner that the speed increases with the distance from the entrance and from the exit of the moving sidewalk, so that the speed of transportation increases or decreases gradually every time when the passenger moves from one module to the adjacent module (2, 2').

In other words, the module 2 includes a loading-unloading belt, and the module 2' includes an accelerating-decelerating belt.

The reference numeral and sign 2*a* designates extra small rollers of a small size such as 30 mm to 70 mm in diameter, which are placed at a distance at both ends of each module 2 or 2', and the effective clearance between the adjacent portions of the upper track is determined to be a smaller size than the infant's shoes, such as 20 mm to 40 mm.

The reference numeral and sign 2*d* designates a T-shaped transporting plate disposed in the clearance between the adjacent pair of modules 2 or 2', so that the upper surface is situated at the lower level than the upper surface of the endless sliding belt 20, which is described to be possible to be omitted when the circulating speed of the endless sliding belt is high.

The reference numeral and sign 2*e* designates a sliding plate that supports and guides the upper track of the endless sliding belt 20, and the reference numeral 27 designates a long main circulating belt that constructs the center portion of the moving sidewalk that is located in the vicinity of the high-speed module 2' and moves at a highest speed.

However, such a variable-speed moving sidewalk has a fundamental problem as follows.

That is, the passenger is directly affected by the difference of the speed when he or she gets on the endless sliding belt running at the different speed, and has a feeling of fear by being stumbled or staggered about.

Accordingly, an object of the present invention is to present a variable-speed moving sidewalk that not only transports the passenger smoothly, but also gives no feeling of fear to the passenger, based on the basic test conducted by the use of an experimental model.

DISCLOSURE OF INVENTION

With the circumstance described above in view, the present invention provides a methodology for setting the speed of each belt of the variable-speed moving sidewalk of belt transit type and the number of connecting belts, and a variable-speed moving sidewalk that can be obtained by this methodology.

In order to achieve the object described above, the present invention is constructed in the manner as follows.

(1) In a moving sidewalk comprising loading-unloading belts and one or more of accelerating-decelerating belt(s) independently provided in front and in the rear of the main circulating belt, wherein the traveling speed of the loading-unloading belt and of the accelerating-decelerating belt are determined to decrease with the decreasing distance to the entrance and the exit thereof, and thus to increase with the decreasing distance to the main circulating belt, and the traveling speed of the main circulating belt is faster than both of these belts, the speeds of the belts adjacent with each other are determined in such a manner that the difference between squares of these speeds does not exceed the prescribed value. In order to achieve the object of giving no feeling of fear to the passenger, the lower limit of the difference between squares of these two speeds is not specially specified. However, when it is too small, the entire speed becomes too slow, whereby a variable-speed mechanism makes no sense to employ. Therefore, it is practically defined to be a prescribed value or higher.

(2) In a moving sidewalk having loading-unloading belts disposed independently in front and in the rear of the main circulating belt, the speeds of the main circulating belt and the loading-unloading belt are set so that the difference between squares of these speeds does not exceed the prescribed value.

In (1) and (2), the specific value of the prescribed value that is to be the upper limit of the difference between squares of the speeds may be about 1600 as a guideline. Though the lower limit is not specially limited as described above, it can be the value such as about 900 or more.

The prescribed value to be the upper limit of the difference between squares of the speeds described above may be different between the accelerating side and the decelerating side, and in such a case, the value of the accelerating side is preferably smaller than that of the decelerating side.

(3) In designing of a moving sidewalk comprising loading-unloading belts and one or more of accelerating-decelerating belt(s) independently provided in front and in the rear of the main circulating belt, wherein the traveling speed of the loading-unloading belt and of the accelerating-decelerating belt are determined to decrease with the decreasing distance to the entrance and the exit thereof, and thus to increase with the decreasing distance to the main circulating belt, and the traveling speed of the main circulating belt is faster than both of these belts, the number of the accelerating-decelerating belts to be provided is determined based on the relation between the difference between squares of the speeds of the adjacent belts and the sense of "fear" of the passenger (a law of the difference between squares of the speeds, described later).

More specifically, the number of the accelerating-decelerating belt described above is determined so that the difference between squares of the speeds of the respective belts adjacent with each other falls within the prescribed range. The prescribed range may be, for example, about 900 to 1600.

Figure 1:
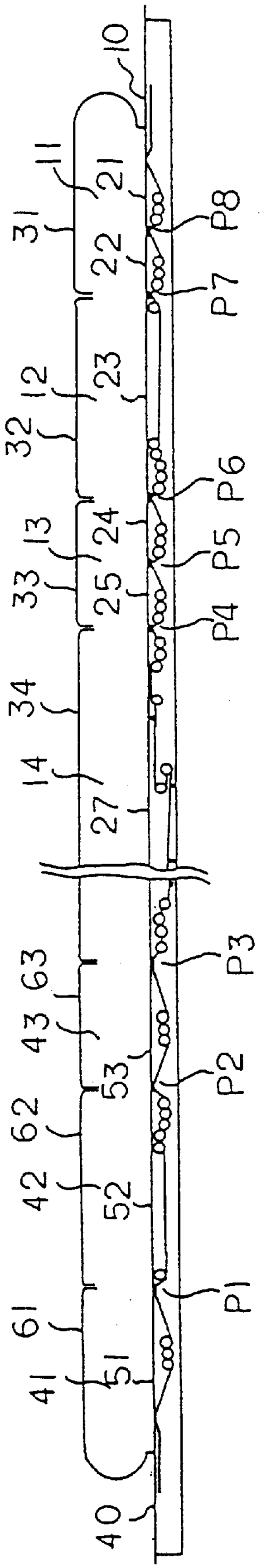
FIG. 1 is a general view of the variable-speed moving sidewalk (experimental model) used for verification of the present invention.
Figure 2:
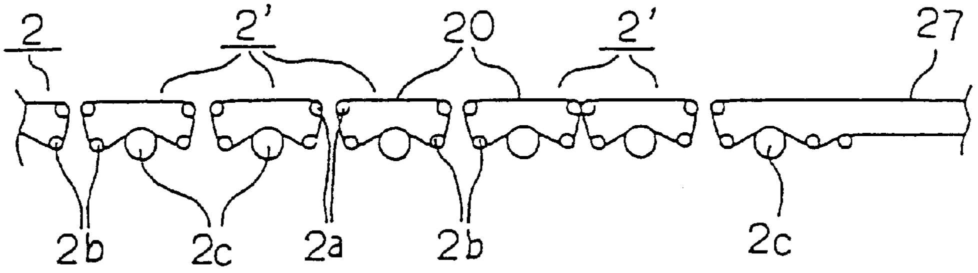
FIG. 2 PRIOR ART
FIG. 2 is a schematic drawing of a prior art moving sidewalk comprising a plurality of endless circulating belts.
Figure 3:
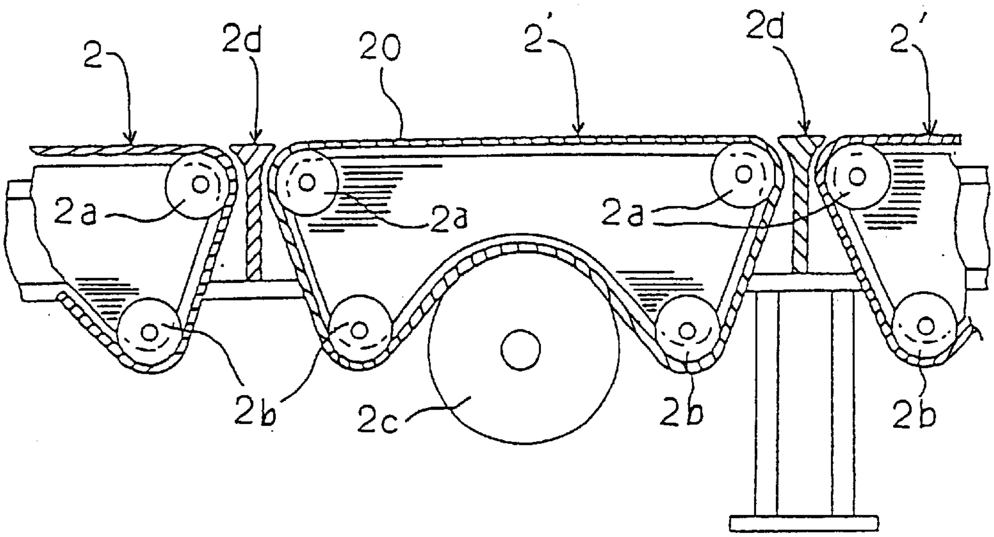
FIG. 3 is a partly enlarged view of the moving sidewalk shown in FIG. 2.
Figure 3:
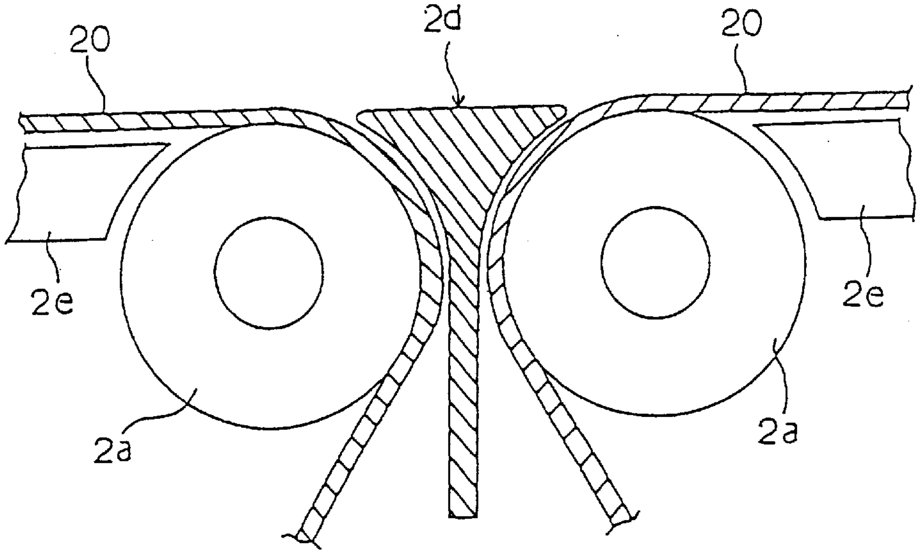

| Reference Numerals | |
|---|---|
| 21, 51 | loading-unloading belt |
| 27 | main circulating belt |
| 22, 52 | first endless sliding belt |
| 23, 53 | second endless sliding belt |
| 24 | third endless sliding belt |
| 25 | fourth endless sliding belt |
| $V_{11}$ | speed of the loading-unloading belt 21 |
| $V_{12}$ | speed of the first endless sliding belt 22 |
| $V_{13}$ | speed of the second endless sliding belt 23 |
| $V_{14}$ | speed of the third endless sliding belt 24 |
| $V_{15}$ | speed of the fourth endless sliding belt 25 |
| $V_{16}$ | speed of the main circulating belt 27 |
| $V_{51}$ | speed of the loading-unloading belt 51 |
| $V_{52}$ | speed of the first endless sliding belt 52 |
| $V_{53}$ | speed of the second endless sliding belt 53 |

BEST MODE FOR CARRYING OUT THE INVENTION

Referring now to the drawing, the present invention will be described. However, the present invention is not limited thereto.

Figure 4:
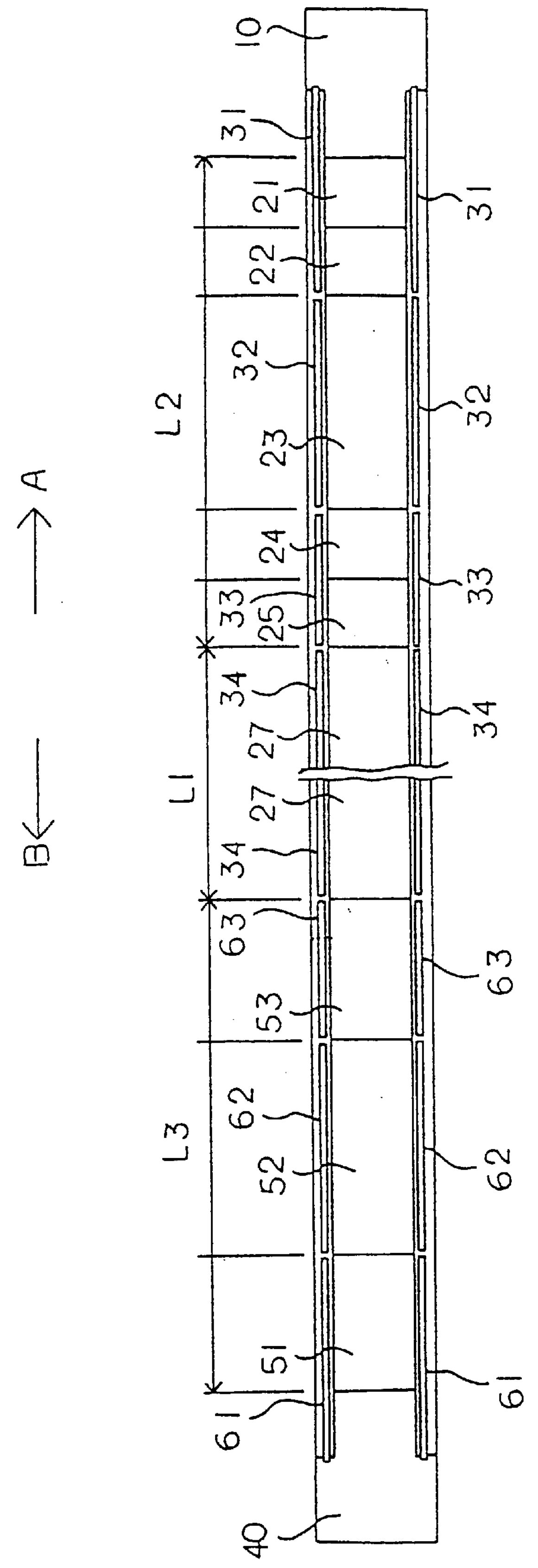
FIG. 4 is a plan view of the moving sidewalk shown in FIG. 1.

FIG. 1 is a general view of the experimental model used for the verification of the present invention, and FIG. 4 is a plan view of the experimental model shown in FIG. 1.

In the figure, the reference numeral 11 designates a balustrade panel standing on the both sides across the loading-unloading belt 21 (circulates at the speed of $V_{11}$) facing toward the floor plate 10 on the driving side at the entrance or the exit of the moving sidewalk and the first endless sliding belt 22 (circulates at the speed of $V_{12}$) adjacent to the loading and unloading belt 21, and the reference numeral 31 designates a moving handrail provided so as to surround the balustrade panel 11.

The reference numeral 12 designates a balustrade panel standing on both sides of the second endless belt 23 (circulates at the speed of $V_{13}$) and the reference numeral 32 is a moving handrail provided so as to surround the balustrade panel 12.

The reference numeral 13 designates a balustrade panel standing on both sides across the third endless sliding belt 24 (circulates at the speed of $V_{14}$) and the next fourth endless sliding belt 25 (circulates at the speed of $V_{15}$), and the reference numeral 33 designates the moving handrail provided so as to surround the balustrade panel 13.

The reference numeral 14 designates a balustrade panel standing on both sides of the main circulating belt 27 (circulates at the speed of $V_{16}$) and the reference numeral 34 designates the moving handrail provided so as to surround the balustrade panel 14.

The reference numeral 41 designates a balustrade panel standing on both sides of the loading-unloading belt 51 (circulates at the speed of $V_{51}$) facing toward the floor plate 40 on the non-driving side, and the reference numeral 61 designates a moving handrail provided so as to surround the balustrade panel 41.

The reference numeral 42 designates a balustrade panel standing on both sides of the first endless sliding belt 52 (circulates at the speed of $V_{52}$) adjacent to the loading-unloading belt 51, and the reference numeral 62 designates a moving handrail provided so as to surround the balustrade panel 42.

The reference numeral 43 designates a balustrade panel standing on both sides of the second endless sliding belt 53 (circulates at the speed of $V_{53}$), and the reference numeral 63 designates a moving handrail provided so as to surround the balustrade panel 43.

This experimental model has, the traveling surface of the main circulating belt 27 of L1=14.46 m, the total traveling surface of the accelerating-decelerating section on the driving side (the loading-unloading belt 21, the first endless sliding belt 22, the second endless sliding belt 23, the third endless sliding belt 24, and the fourth endless sliding belt 25) of L2=9.78 m, the total traveling surface of the accelerating-decelerating section on the non-driving side (the loading-unloading belt 51, the first endless sliding belt 52, and the second endless sliding belt 53) of L3=8.2 m, and the total length of 32.44 m, arranged so that the arbitrary speed at about 120 m/min. or below can be obtained by the inverter.

However, the speed ratio between the main circulating belt 27 and the loading-unloading belt 21 is fixed to 3, and the speed ratio between the main circulating belt 27 and the loading-unloading belt 51 is fixed to 2.7. The speed ratios between other adjacent belts are fixed to the prescribed values.

For instance, when the main circulating belt 27 is 120 m/min., the loading-unloading belt 21 is set to 41 m/min., the loading-unloading belt 51 to 45 m/min., the first endless sliding belt 22 to 51 m/min., the first endless sliding belt 52 to 63 m/min., the second endless sliding belt 23 to 62 m/min., the second endless sliding belt 53 to 88 m/min., the third endless sliding belt 24 to 78 m/min., and the forth endless sliding belt 25 to 94 m/min.

In such an apparatus, by varying the speed of the belt of the fastest section, or of the main circulating belt 27, the belt transit portions of various differences between the speeds are obtained, whereby the affect to the passenger can be taken a close look.

For example, the actual test was conducted for the "30 persons from twenties to sixties", in which the belt speed at the fastest section was varied at random to 60 m/min., 80 m/min., 100 m/min., and 120 m/min. (inconsecutive), and let them travel thereon several times, and the survey was conducted on the state of fear at the transit portions of each belt. As a result, the experimental data shown in FIG. 5 and FIG. 6 were obtained. They are the tabulations of the results of the survey on the transit portion of the belt that gave the tested persons a feeling of fear most in the direction A of FIG. 4, which is shown in FIG. 5, and in the direction B of FIG. 4, which is shown in FIG. 6.

Figure 5:
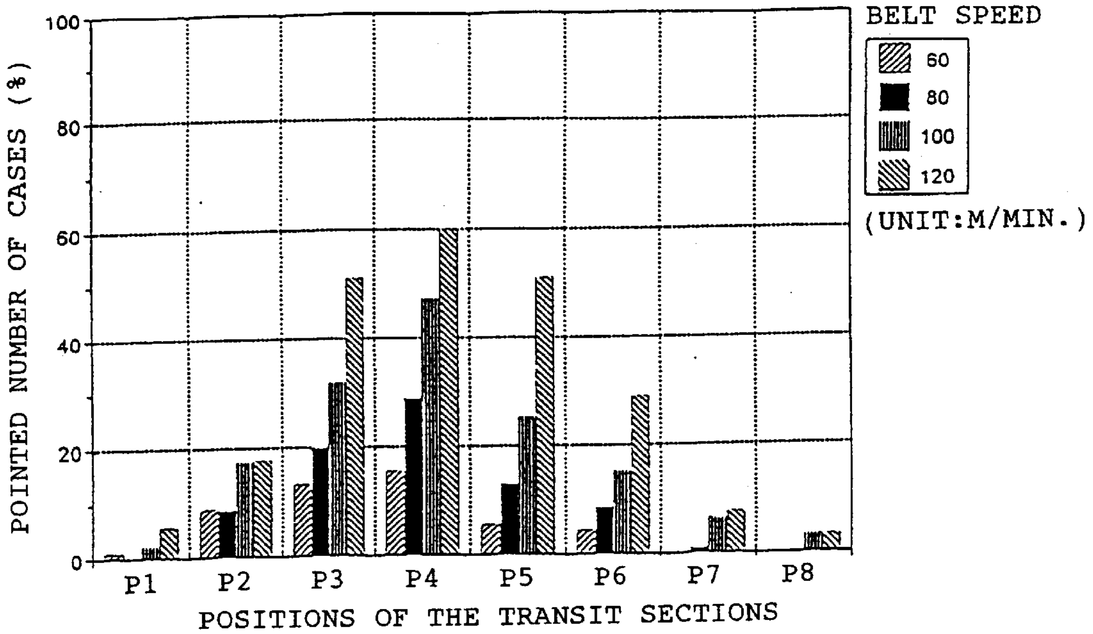
FIG. 5 is a view showing the tabulation of experimental data obtained in the operation in the direction of A in FIG. 4.
Figure 6:
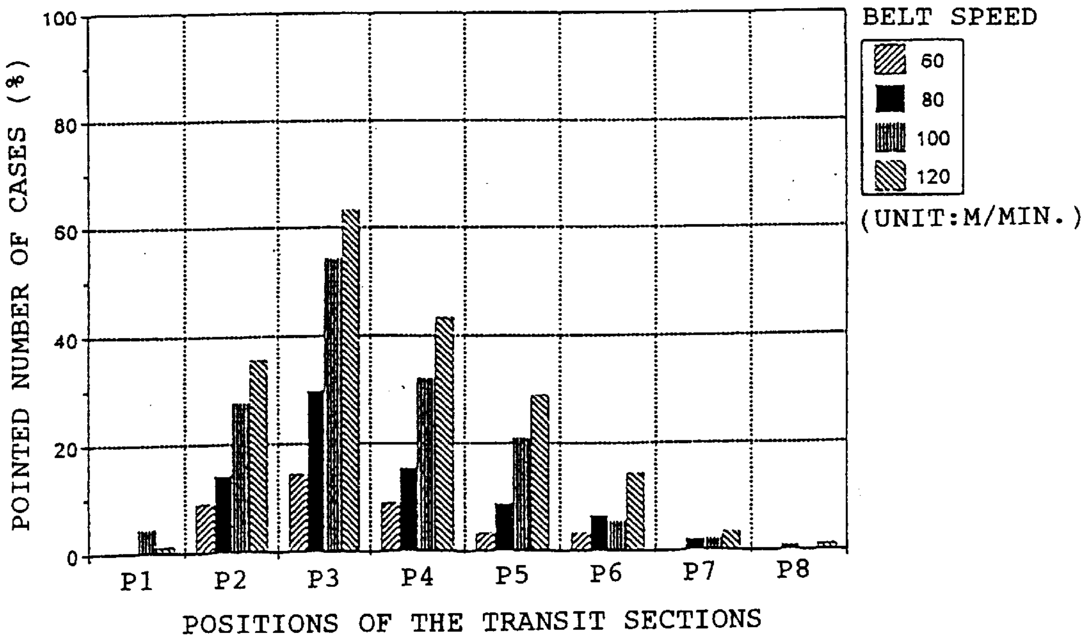
FIG. 6 is a view showing the tabulation of experimental data obtained in the operation in the direction of B in FIG. 4.

FIG. 5 and FIG. 6 show that many tested persons had a feeling of "fear" at the belt transit portions. It seems to be mainly because "they felt a feeling of fear since they lose their balance of the posture at the belt transit portions".

Since the off-balance of the posture seems to be caused by a force applied by the tread of the belt, a force applied to the passenger from the belt tread will be described.

Figure 7:
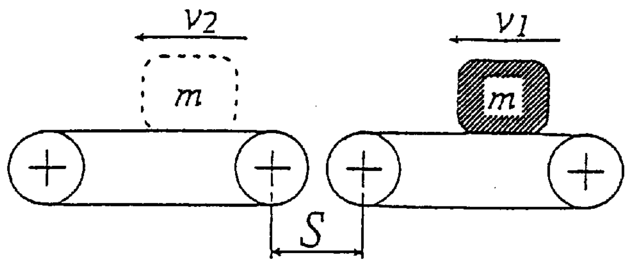
FIG. 7 is a view showing a simplified model of the belt transit portion.

FIG. 7 shows a simplified model of the belt transit portion.

When the substance or a passenger having a mass m passes across the belts while standing still on the belt, a force applied by the belt is expressed by the formula (1) shown below according to the equation of motion. Where, f (kg·m/s$^2$) is a force applied when passing across the belts, $\alpha$ (m/s$^2$) is acceleration when passing across the belts.

$$f=m\times\alpha \tag{1}$$

The acceleration when passing across the belts a is expressed by the following formula (2). Where, $V_1$ (m/s) is a speed of the belt before transit, $V_2$ (m/s) is a speed of the belt after transit, and t (s) is a time when passing across the belts.

$$\alpha=\frac{V_2-V_1}{t} \tag{2}$$

The time t which is needed to pass across the belts is shown by the formula (3). Where, V (m/s) is a mean speed of the substance (m) at the transit portion, and s (m) is a distance of the belt transit.

$$t=\frac{s}{V}=\frac{s}{\frac{V_2+V_1}{2}}=\frac{2s}{V_2+V_1} \tag{3}$$

When the formula (2) and the formula (3) are substituted to the formula (1), the following formula (4) is obtained.

$$f=m\times\frac{V_2-V_1}{\frac{2s}{V_2+V_1}}=m\times\frac{V_2^2-V_1^2}{2s} \tag{4}$$

The formula (4) shows that the force f applied by the belt when passing across the belts is in proportional to the difference between squares of the belt speeds before and after the transit.

Therefore, the "feeling of fear" of the passenger seems to increase in proportional to the difference between squares of the speeds.

Figure 8:
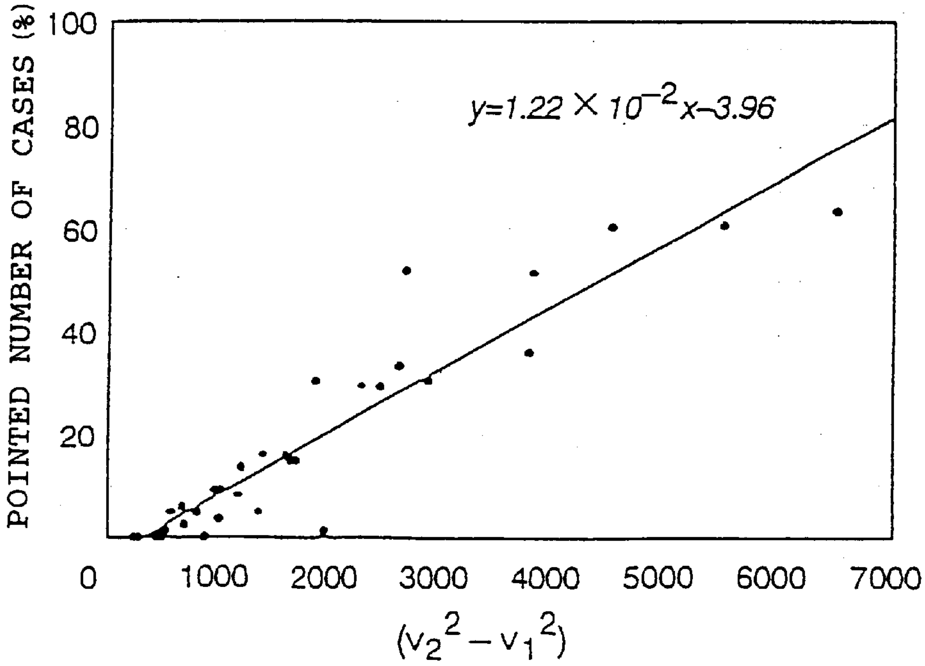
FIG. 8 is a drawing showing the relation between the between squares of the speeds of the adjacent belts at the time of acceleration and the pointed number of cases.
Figure 9:
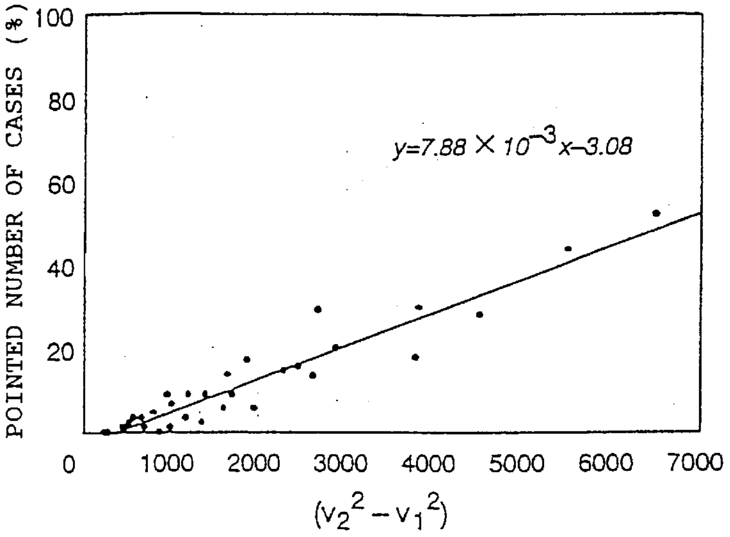
FIG. 9 is a drawing showing the relation between the between squares of the speeds of the adjacent belts at the time of deceleration and the pointed number of cases.

In order to verify whether or not the hypothesis that "the feeling of fear is in proportional to the difference between squares of the speeds" is correct, the relation between the difference between squares of the belt speeds before and after the transit and the pointed number of cases (%) where the passenger had a feeling of fear obtained in the survey is shown in a graph in FIG. 8 and FIG. 9.

The horizontal axis (x-axis) represents the difference between squares of the belt speeds (m$^2$/min$^2$), the vertical axis (y-axis) represents the pointed number of cases (%), and the pointed number of cases (%) is calculated from (pointed number of cases/total number of times of loading and unloading)x100.

The graphs are made for the case of acceleration and for the case of deceleration separately because the passenger is more likely to keep his body balance when he or she staggers forward (in case of deceleration), but the passenger is more likely to loose his or her body balance when he or she staggers backward (in case of acceleration). FIG. 8 shows the case of acceleration, and FIG. 9 shows the case of deceleration.

When linear approximation by the method of least squares was attempted for each data, the results shown by the formula (5) and the formula (6) were obtained. The formula (5) is for the case of the acceleration that shows correlation coefficient of 0.93 and the formula (6) is for the case of deceleration that shows correlation coefficient of 0.95.

$$y=1.22\times10^{-2}x-3.96 \tag{5}$$

$$y=7.88\times10^{-3}x-3.08 \tag{6}$$

Since very preferable correlation is found in both cases, it can be concluded that a feeling of fear is correlated with the difference between squares of the speeds.

It is defined as a law of the difference between squares of the speeds here.

Assuming that the value below 10% of the pointed number of cases is the suitable value, the upper limits value of the difference between squares of the speeds at the belt transit portion are 1140 and 1660 from the formula (5) and the formula (6) respectively.

On the other hand, the speed of the moving sidewalk generally used nowadays is 30–40 m/min., and the difference between squares of the speeds at the loading- unloading section in this case is 900 (=30$^2$) to 1600 (=40$^2$). From the fact that the passenger can get on and off safely and comfortably at this speed, it seems to be preferable if the difference between squares of the speeds is determined so that it falls within the range of about 900–1600 m$^2$/min$^2$. However, according to the formula (5) above, it seems to be more preferable to limit the difference between squares of the speeds to about 1140 m$^2$/min$^2$ or below so that more than 90% of passengers can get on and off, or pass across comfortably.

It means that the minimum number of belt transit portions necessary for the passenger to carry out loading and unloading, or transit comfortably, or the number of the belts to be connected in series, is obtained by itself according to a law of the difference between squares of the speeds when the belt speed at the loading portion is limited to the range of 30–40 m/min., which is the same speed of the normal moving sidewalk, and the maximum belt speed is determined.

Figure 10:
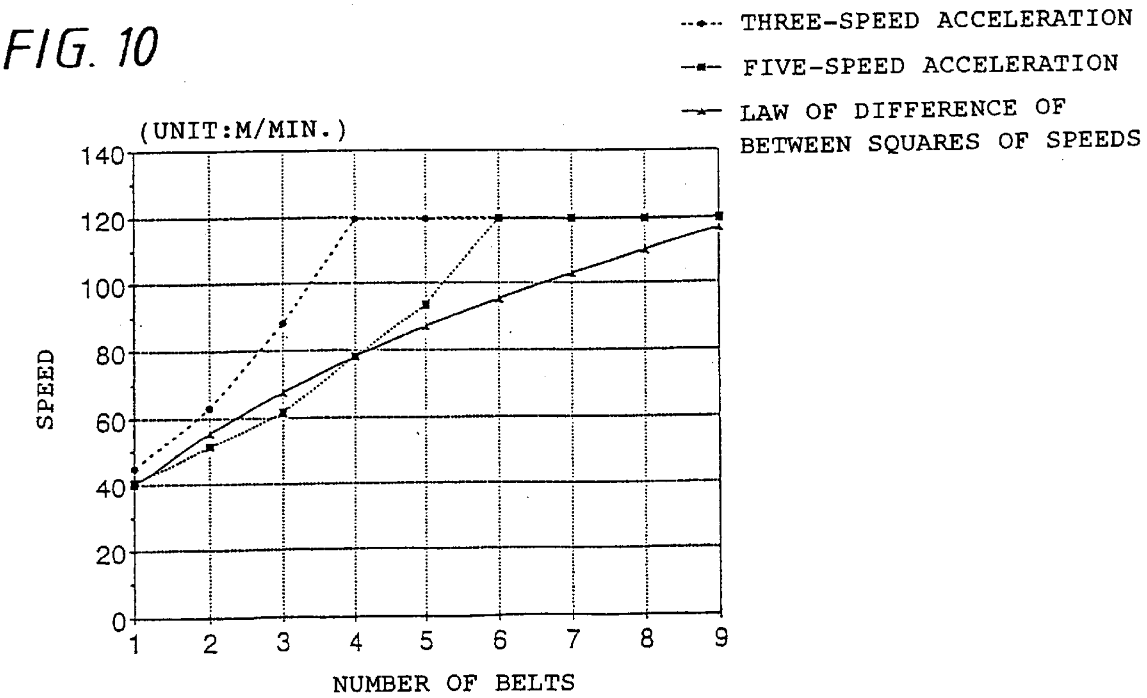
FIG. 10 is a drawing showing an example of the relation between the speed of the belt traveling at the highest speed and the number of the belts.

FIG. 10 shows an example of the relation between the belt speed at the fastest section and the number of the belts. Here, the belt speed at the loading section is set to about 40 m/min., and the difference between squares of the speeds is set to 1500 with some margins. From this figure, it is known that when the belt speed at the fastest section is 80 m/min., the number of speed-levels of the belt at the accelerating-decelerating section may be three, but when the belt speed at the fastest section is as high as 120 m/min., the number of the belt at the accelerating-decelerating section must be at least eight. For comparison, the case of this experimental model (three-speed acceleration, five-speed acceleration) is also plotted in FIG. 10.

FIG. 10 is only an example, and thus the least number of the belt required will vary, as a matter of course, depending on the prerequisites such as the set value of the difference between squares of the speeds at the belt transit section, or the set value of the belt speed at the loading section, and so on.

As is described thus far, according to the present invention, a variable-speed moving sidewalk can easily obtained by focusing on the difference between squares of the speeds of the adjacent belts. Therefore, a variable-speed moving sidewalk that can realize the comfortable and safe transportation of the passenger can be provided at low cost.

Industrial Applicability though the location to set up a variable-speed moving sidewalk of the present invention is not limited, it is especially preferable for the places, such as the airport, that requires transportation of relatively long distance.

What is claimed is:

1. A variable-speed moving sidewalk comprising loading-unloading belts and one or more of accelerating-decelerating belt(s) independently provided in front and in the rear of a main circulating belt having a speed exceeding 40 m/min., wherein the traveling speed of the loading-unloading belt and of the accelerating-decelerating belt are determined to decrease with the decreasing distance to the entrance and the exit thereof, and thus to increase with the decreasing distance to the main circulating belt, and the traveling speed of the main circulating belt is faster than both of these belts, and the respective speeds (m/min.) of the belts adjacent to each other are determined so that any differences between the squares of these speeds does not exceed the value of 1140 $m^2/min^2$.

2. A variable-speed moving sidewalk having loading-unloading belts disposed independently in front and in the rear of a main circulating belt having a speed exceeding 40 m/min., and only comprising said loading-unloading belt and said main circulating belts, wherein the respective speeds (m/min.) of the main circulating belt and the loading-unloading belt are set so that the difference between squares of the speeds of these belts does not to exceed the value of 1140 $m^2/min^2$.

3. A method of designing a variable-speed moving sidewalk comprising loading-unloading belts and one or more of accelerating-decelerating belt(s) independently provided in front and in the rear of a main circulating belt, wherein the traveling speed of the loading-unloading belt and of the accelerating-decelerating belt are determined to decrease with the decreasing distance to the entrance and the exit thereof, and thus to increase with the decreasing distance to the main circulating belt, and the traveling speed of the main circulating belt is faster than both of these belts, wherein the respective speeds of said loading-unloading belts and of said main circulating belt are determined, and then the respective speeds of said plurality of accelerating-decelerating belts are determined so that an absolute value of any differences between squares of the respective speeds (m/min.) of the belts adjacent to each other do not exceed a prescribed value of an upper limit of 1140 $m^2/min^2$.

4. A variable-speed moving sidewalk having loading-unloading belts of a speed of at least 30 m/min. disposed independently in front and in the rear of a main circulating belt, and only comprising said loading-unloading belts and said main circulating belt, wherein the respective speeds (m/min.) of said main circulating belt and said loading-unloading belts are determined so that the difference between the squares of the speeds of these belts does not exceed 1140 $m^2/min^2$.

* * * * *